(12) United States Patent
Lee (10) Patent No.: US 8,022,786 B2
(45) Date of Patent: Sep. 20, 2011

(54) FRONT-END CIRCUIT OF THE WIRELESS TRANSCEIVER

(75) Inventor: Chien-Kuang Lee, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 232 days.

(21) Appl. No.: 12/265,289

(22) Filed: Nov. 5, 2008

(65) Prior Publication Data

US 2009/0115549 A1 May 7, 2009

(30) Foreign Application Priority Data

Nov. 7, 2007 (CN) .......................... 2007 1 0166396

(51) Int. Cl.
*H01P 1/10* (2006.01)
*H04B 1/44* (2006.01)
(52) U.S. Cl. ............................ 333/101; 333/103; 455/78
(58) Field of Classification Search .................. 333/101, 333/103, 104, 105; 455/78
See application file for complete search history.

(56) References Cited

U.S. PATENT DOCUMENTS

| | | | | |
|---|---|---|---|---|
| 5,768,691 A * | 6/1998 | Matero et al. | ................... | 455/78 |
| 6,009,314 A * | 12/1999 | Bjork et al. | ................... | 455/83 |
| 7,283,793 B1 * | 10/2007 | McKay | ........................... | 455/83 |
| 7,313,368 B2 * | 12/2007 | Wu et al. | ........................ | 455/73 |
| 7,417,515 B2 * | 8/2008 | Chominski | .................. | 333/105 |
| 2006/0135084 A1 * | 6/2006 | Lee | ............................... | 455/78 |

FOREIGN PATENT DOCUMENTS

| CN | 1378400 A | 11/2002 |
|---|---|---|
| CN | 1801644 A | 7/2006 |

* cited by examiner

*Primary Examiner* — Dean Takaoka
(74) *Attorney, Agent, or Firm* — Muncy, Geissler, Olds & Lowe, PLLC (57) ABSTRACT

A front-end circuit of the wireless transceiver is disclosed to reduce the number of the pin count of the chip, and achieve the impedance matching. The circuit comprises an antenna unit, a receiver, and a transmitting block, all of which are connected together, wherein there is no switch provided between the receiver and the antenna unit, such that the loss of switch can be avoided for reducing the noise figure and improve the sensitivity of the receiving path accordingly.

12 Claims, 9 Drawing Sheets

FRONT-END CIRCUIT OF THE WIRELESS TRANSCEIVER

FIELD OF THE INVENTION

The present invention relates to a front-end circuit of the wireless transceiver, and more particularly to a front-end circuit of the wireless transceiver that can be used to reduce the number of the pin count of the chip and achieve the impedance matching.

BACKGROUND OF THE INVENTION

Figure 1:
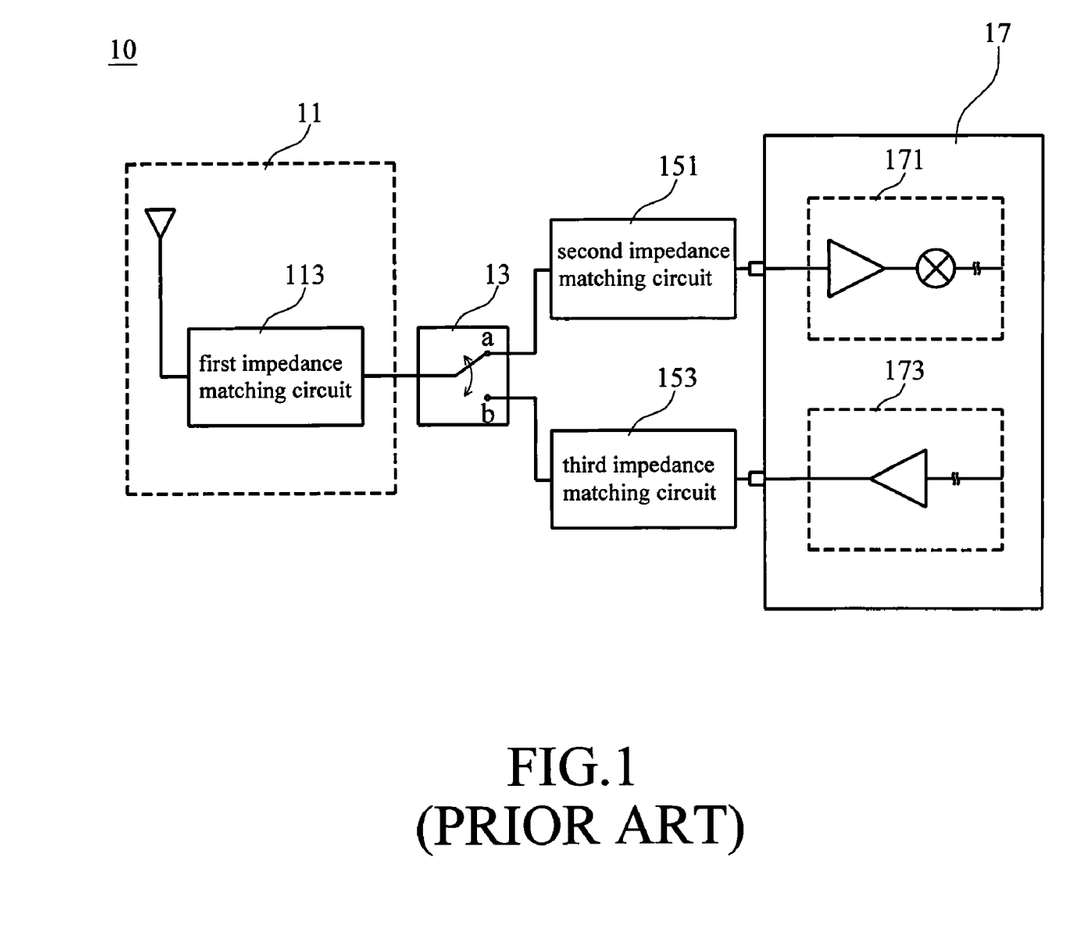
FIG. 1 is a block diagram of a front-end circuit for the wireless transceiver in accordance with a prior art.

Referring to FIG. 1, a block diagram of wireless transceiver with respect to the prior art is showed. The transceiver comprises a front-end circuit 10 and a back end circuit, wherein the front-end circuit 10 is used for transmitting and receiving wireless signal, comprising an antenna unit 11, a switch 13, a receiver 171 and a transmitter 173, wherein the receiver 171 and the transmitter 173 are integrated into a single chip 17.

The switch 13 is used for controlling the wireless transceiver to transmit or receive signal. While the front-end circuit 10 is receiving the signal, the switch 13 can switch to "a" terminal, thereby, the antenna unit 11 will be connected to the receiver 171 through the switch 13, accordingly, the receiving signal will be sent to the receiver 171 from the antenna unit 11. Otherwise, while the front-end circuit 10 is transmitting the signal, the switch 13 can switch to "b" terminal, thereby, the antenna unit 11 will be connected to the transmitter 173 through the switch 13, accordingly, the transmitting signal will be sent to the antenna unit 11 from the transmitter 173.

Generally, in order to reduce signal loss due to impedance mismatch, several matching circuits should be applied to the front-end circuit. A first external impedance matching circuit 113 is provided within the antenna unit 11, a second external impedance matching circuit 151 is provided between the antenna unit 11 and the receiver 171, and a third external impedance matching circuit 153 is provided between the antenna unit 11 and the transmitter 173. Therefore, the impedance matching between the antenna unit 11 and the receiver 171 or between the antenna unit 11 and the transmitter 173 can be achieved according to the first external impedance matching circuit 113, the second external impedance matching circuit 151, and the third external impedance matching circuit 153.

Figure 2:
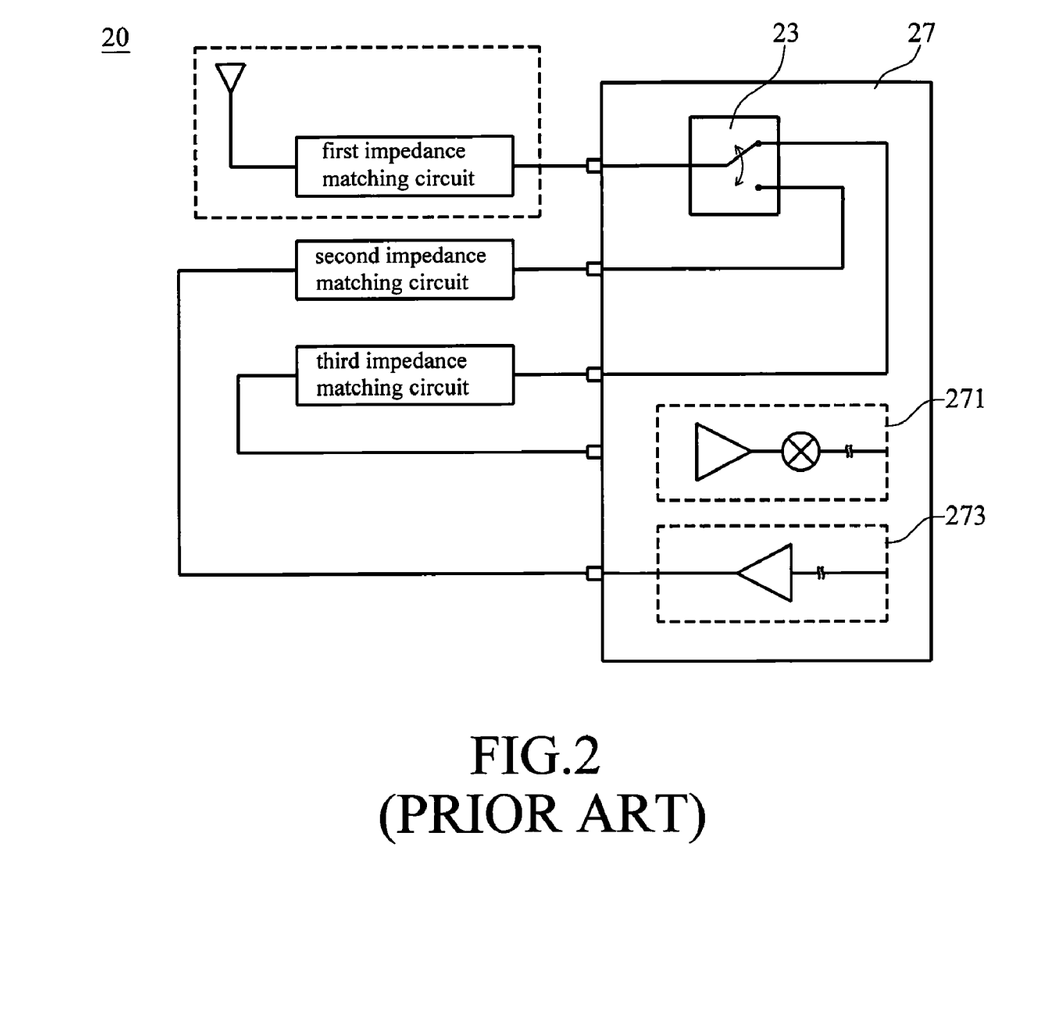
FIG. 2 is a block diagram of a front-end circuit for the wireless transceiver in accordance with another prior art.

Referring to FIG. 2, a block diagram of another wireless transceiver with respect to the prior art is shown. The wireless transceiver comprises a front-end circuit 20 and a back end circuit. The difference between this wireless transceiver and foregoing mentioned wireless transceiver is that the switch 23, receiver 271, and transmitter 273 are integrated into a single chip 27, thereby; a simplified front-end circuit 20 can be achieved. However, the pin count of the chip 27 will be increased accordingly since the switch 23 is integrated within the chip 27. The chip 27 therefore requires additional pins for connecting the terminals of switch 23.

Furthermore, according to the foregoing mentioned front-end circuits 10 and 20, the switches 13 and 23 thereof are used for controlling to receive or transmit signal, as well as, the signal will pass through the switches 13 and 23 during the receiving or transmitting process. However, signal pass through the switches 13 and 23 would causes the signal loss, such that the noise figure will be increased on the process of receiving signal, as well as, the output power will be degraded on the process of transmitting signal, thereby, the front-end circuits 10 and 20 cannot be applied for the wireless transceiver that demands low noise figure or high output power.

SUMMARY OF THE INVENTION

Therefore, a front-end circuit of the wireless transceiver is disclosed to overcome the foregoing problems according to the present invention, especially, it is with fewer pin count of the chip, furthermore, the noise figure can be reduced with respect to the signal receiving path, or the output power can be increased with respect to the signal transmitting path.

An object of the present invention is to provide a front-end circuit of the wireless transceiver, wherein the noise figure can be reduced accordingly since the signal is passed through the receiving path that is between the receiver and the antenna unit without the switch.

Another object of the present invention is to provide a front-end circuit of the wireless transceiver, wherein the output power can be increased accordingly since the signal is passed through the transmitting path that is between the transmitter and the antenna unit without the switch.

Another object of the present invention is to provide a front-end circuit of the wireless transceiver, wherein the switch, the second impedance matching circuit, the transmitter, and the receiver are integrated within a single chip, thereby, the pin count of the chip can be reduced, as well as, the second impedance matching circuit can be selectively provided for demand.

Another object of the present invention is to provide a front-end circuit of the wireless transceiver, wherein the second impedance matching circuit is provided within the transmitting block for reducing the noise figure of the receiving path, thereby, the impedance matching between the antenna unit and the transmitting path can be achieved when the front-end circuit is operating on transmitting mode. And the impedance matching between the antenna unit and the receiving path can also be achieved when the front-end circuit is operating on receiving mode.

Another object of the present invention is to provide a front-end circuit of the wireless transceiver, wherein the second impedance matching circuit is provided within the receiver, therefore, the output power can be increased with respect to the transmitting path, such that the impedance matching between the antenna unit and the transmitting path can be achieved when the front-end circuit is operating on transmitting mode. And the impedance matching between the antenna unit and the receiving path can be achieved when the front-end circuit is operating on receiving mode.

In an aspect of the present invention, a front-end circuit of the wireless transceiver is provided, comprising an antenna unit, comprising an antenna and a first impedance matching circuit; a receiver, connected to the antenna unit; and a transmitting block, connected to the antenna unit and the receiver, comprising a transmitter and a first switch, wherein the receiver and the transmitting block are integrated within a single chip.

In another aspect of the present invention, a front-end circuit of the wireless transceiver, comprising an antenna unit, comprising an antenna and a first impedance matching circuit; a transmitter, connected to the antenna unit; and a receiving block, connected to the antenna and the transmitter, comprising a receiver and a first switch, wherein the receiving block and the transmitter are integrated within a single chip.

BRIEF DESCRIPTION OF THE DRAWINGS

The accompanying figures, where like reference numerals refer to identical or functionally close elements throughout the separate views and which together with the detailed description below are incorporated in and form part of the specification, serve to further illustrate various embodiments and to explain various principles and advantages in accordance with the present invention.

DETAILED DESCRIPTION OF DISCLOSED EMBODIMENTS

Figure 3:
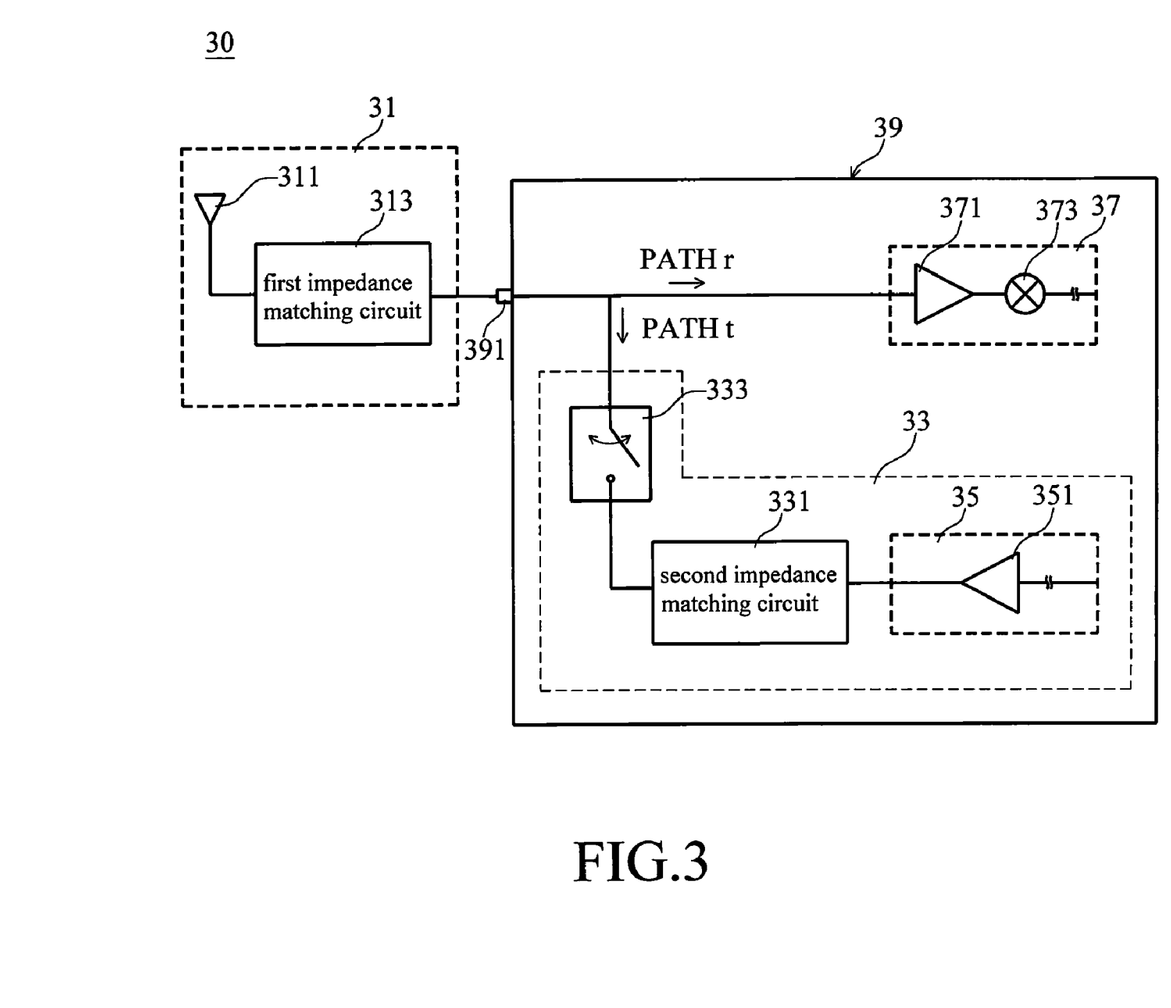
FIG. 3 is a block diagram showing a front-end circuit of the wireless transceiver in accordance with an embodiment of the present invention.

Referring to FIG. 3, a block diagram showing a front-end circuit of the wireless transceiver in accordance with an embodiment of the present invention is disclosed. The wireless transceiver comprises a front-end circuit 30 and a back end circuit, wherein the front-end circuit 30 comprises an antenna unit 31, a receiver 37, and a transmitting block 33, all of which are connected.

The antenna unit 31 of the front-end circuit 30 comprises an antenna 311 and a first impedance matching circuit 313, as well as, the antenna unit 31 is used as a transmission interface for the receiving or transmitting wireless signal. The receiver 37 and the transmitting block 33 are integrated within a single chip 39, having the pin 391 for connecting to the first impedance matching circuit 313 of the antenna unit 31. While the antenna unit 31 is receiving the wireless signal, the signal will be sent to the chip 39 through the pin 391, as well as, while the antenna unit 31 is transmitting the wireless signal, the signal will be sent to the antenna unit 31 through the pin 391 from the chip 39.

The chip 39 comprises the receiver 37 and the transmitting block 33, wherein the receiver 37 and the transmitting block 33 are connected together within the single chip 39, both of which are connected to the antenna unit 31 through the same pin 391 for reducing the pin count of the chip 39. The transmitting block 33 comprises a first switch 333, a second impedance matching circuit 331, and a transmitter 35, wherein the first switch 333 is used for switching the operation mode of the front-end circuit 30, such as transmitting or receiving signal.

While the front-end circuit 30 is receiving the wireless signal, the first switch 333 can be turned off, thereby, the transmitting block 33 and the transmitter 35 will not be connected to the antenna unit 31, and the wireless signal that is receiving by the antenna unit 31 will be sent to the receiver 37 through the receiving path (PATH r) directly. The receiver 37 comprises at least one mixer 373 and one amplifier 371, such as the low noise amplifier, LNA, wherein the amplifier 371 is used for amplifying the received signal, and the mixer 373 is used for converting the amplified radio frequency (RF) signal to be as an intermediate frequency or a low frequency that can be processed by back end circuits.

On the other hand, while the front-end circuit 30 is transmitting signal, the first switch 333 will be turned on, thereby, the transmitting block 33 will connect to the antenna unit 31, as well as, the receiver 37 will be shut down, for example, the supply current or voltage of the receiver 37 will be shut off, thereafter, the transmitting block 33 will send the signal to the antenna unit 31 without seeing too much loading effect from the receiver 37. The transmitter 35 comprises at least one amplifier 351, such as the power amplifier, PA, which will amplify the signal sent from back end circuits, thereafter, the amplified signal will be sent to the antenna unit 31 through the second impedance matching circuit 331 and the first switch 333 for transmitting.

The antenna unit 31 comprises a first impedance matching circuit 313, and the transmitting block 33 comprises a second impedance matching circuit 331, thereby, according to the first impedance matching circuit 313 and second impedance matching circuit 331, the circuit impedance can be adjusted, such that the impedance matching between the antenna unit 31 and the receiver 37 or between the antenna unit 31 and the transmitting block 33 can be achieved. For example, according to the design of the second impedance matching circuit 331, the impedance of the receiving path (PATH r) and the impedance of the transmitting path (PATH t) can be adjusted to be similar, thereby, the transmitting block 33 and the receiver 37 can share the same first impedance matching circuit 313. Generally, the impedance matching circuit 313 and 331 consists of the transformer, resistor, capacitor, and/or inductor.

According to the embodiment of the present invention, the first switch 333 and the second impedance matching circuit 331 are provided within the transmitting block 33, thereby, the first switch 333 and the second impedance matching circuit 331 are provided on the transmitting path (PATH t) between the transmitter 35 and the antenna unit 31 for switching the operation mode. Since there is no switch and/or impedance matching circuit inside the chip on receiving path (PATH r) between the receiver 37 and the antenna unit 31. Therefore, the loss of switch and internal matching circuit can be avoided in the receiving mode such that the noise figure of the receiver will be lower, therefore, the front-end circuit 30 can be applied for the wireless transceiver that requires better receiving sensitivity. Furthermore, while the front-end circuit 30 is receiving signal, the first switch 333 is turned off, thereby, the receiver 37 will not be connected to the transmitting block 33 or the transmitter 35, such that the quality of the receiving signal that is received by the receiver 37 will not be degraded by seeing too much loading effect from the transmitter 33.

Certainly, positions of the second impedance matching circuit 331 and the first switch 333 can be exchanged, for example, the transmitter 35 is connected to the antenna unit 31 through the second impedance matching circuit 331 and the first switch 333 in turn, otherwise, the transmitter 35 is connected to the antenna unit 31 through the first switch 333 and second impedance matching circuit 331 in turn.

Figure 4:
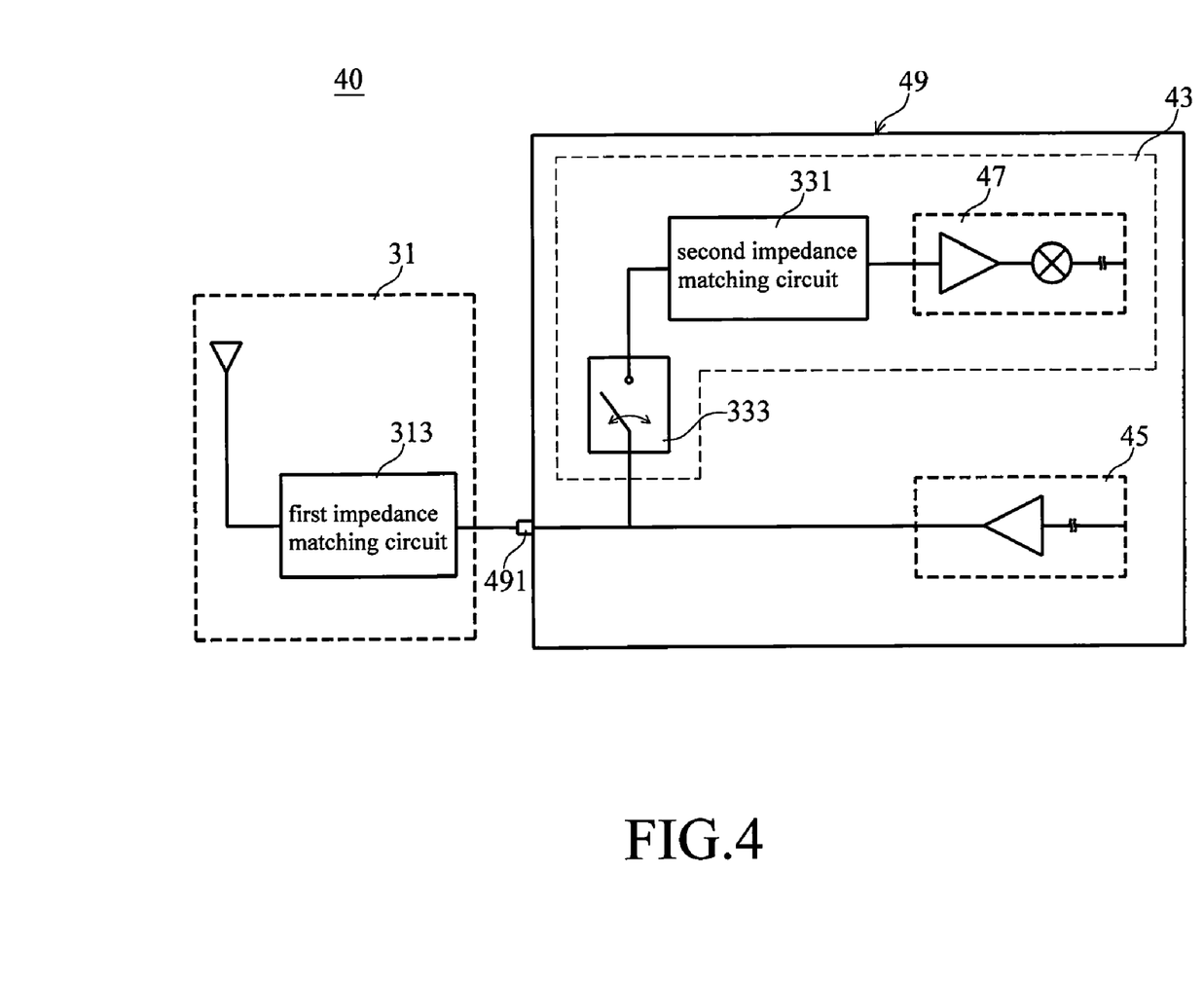
FIG. 4 is a block diagram showing a front-end circuit of the wireless transceiver in accordance with another embodiment of the present invention.

Referring to FIG. 4, a block diagram showing a front-end circuit of the wireless transceiver according to another embodiment of the present invention is disclosed. The wireless transceiver comprises a front-end circuit 40 and back end circuits as well, wherein the front-end circuit 40 comprises an antenna unit 31, a receiving block 43, and a transmitter 45, all of which are connected.

The receiving block 43 and the transmitter 45 are integrated within a single chip 49, having the pin 491 for connecting to the antenna unit 31. The receiving block 43 comprises a receiver 47, a second impedance matching circuit 331, and a first switch 333. The receiver 47 is connected to the antenna unit 31 and the transmitter 45 through the second impedance matching circuit 331 and the first switch 333, wherein the positions of the first switch 333 and the second impedance matching circuit 331 can be exchanged.

The first switch 333 can be used for switching the operation mode of the front-end circuit 40, for example, while the first switch 333 is turned off, the transmitter 45 will send the signal to the antenna unit 31 for transmitting, on the other hand, while the first switch 333 is turned on, the operation supply current or voltage of the transmitter 45 will be shut off, thereafter, the signal receiving from the antenna unit 31 will be sent to the receiver 47 through the first switch 333 and the second impedance matching circuit 331 without seeing too much loading effect from the transmitter 45.

The second impedance matching circuit 331 and the first switch 333 are provided within the receiving block 43, and there is no switch and/or the impedance matching circuit inside the chip on the transmitting path between the transmitter 45 and the antenna unit 31. Therefore, the loss of switch and internal matching circuit can be avoided in the transmitting mode, such that the output power of the transmitter will be improved accordingly. Furthermore, by adjusting the first impedance matching circuit 313 and the second impedance matching circuit 331, the impedance matching between the antenna unit 31 and the receiving block 43 or between the antenna unit 31 and the transmitter 45 can be achieved.

According to the different features of the foregoing mentioned embodiments shown on FIG. 3 and FIG. 4, the user can select one of the front-end circuits 30 and 40 depending on the demand, for example, if the user would like to obtain a transceiver with lower noise figure, then the front-end circuit 30 according to the embodiment shown on FIG. 3 would be the option, as well as, if the user would like to obtain a transceiver with higher output power, then, the front-end circuit 40 according to the embodiment shown on FIG. 4 would be the option.

Figure 5:
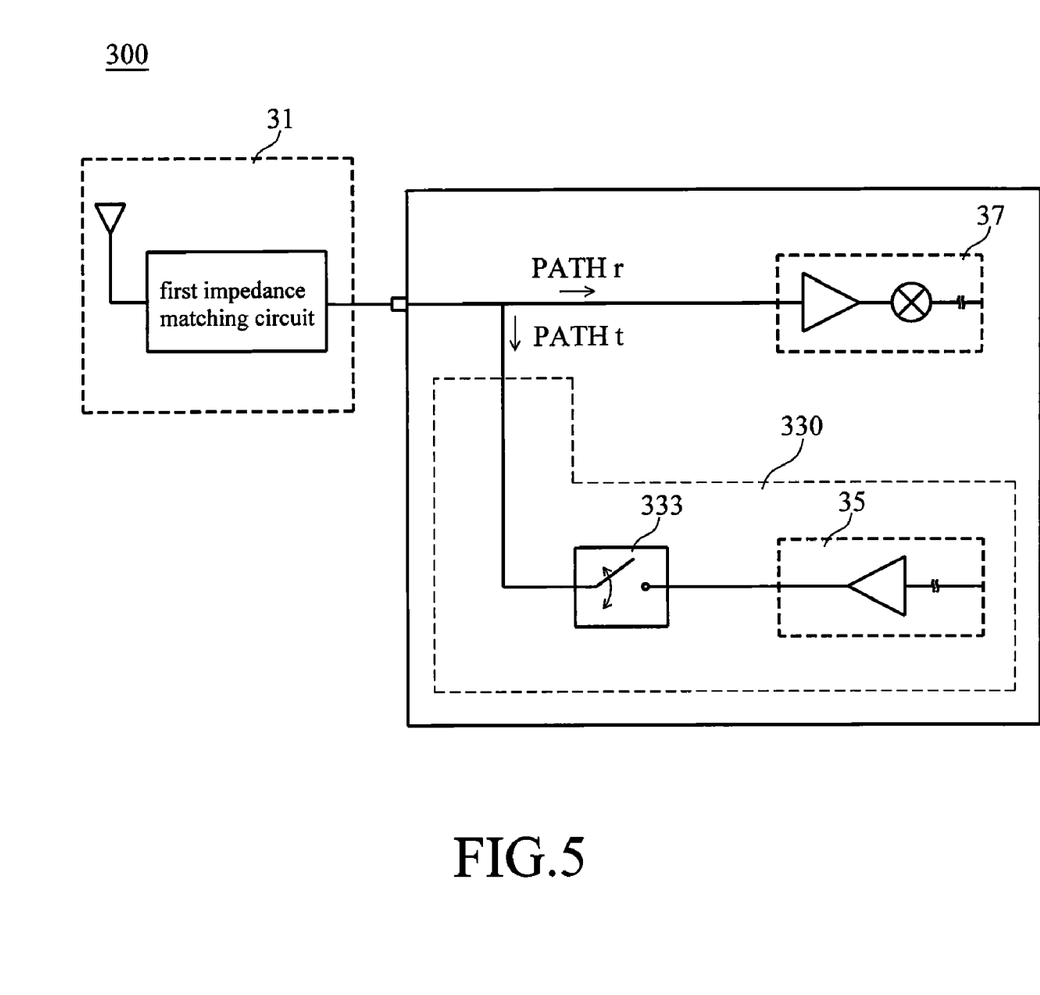
FIG. 5 is a block diagram showing a front-end circuit of the wireless transceiver in accordance with another embodiment of the present invention.
Figure 6:
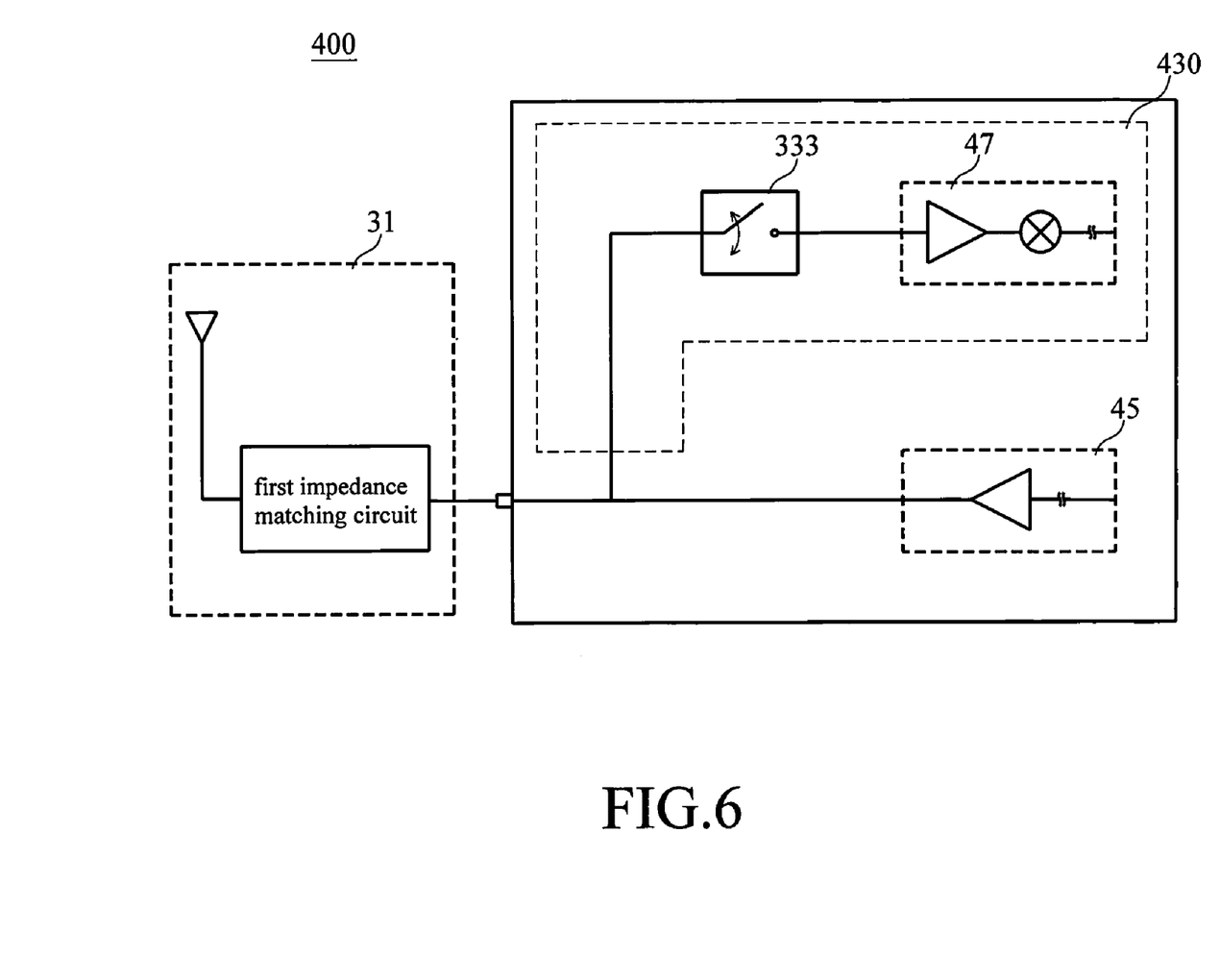
FIG. 6 is a block diagram showing a front-end circuit of the wireless transceiver in accordance with another embodiment of the present invention.

Referring to FIG. 5 and FIG. 6, block diagrams showing a front-end circuit of the wireless transceiver in accordance with another embodiment of the present invention are disclosed. The front-end circuits 300 and 400 are without the second impedance matching circuit 331 shown on FIG. 3 and FIG. 4, in other words, the transmitting block 330 and receiving block 430 are without the second impedance matching circuit 331.

With respect to the embodiment of the present invention, if the design of the first switch 333 and the transmitter 35 can achieve impedance matching between them, then the second impedance matching circuit 331 can be absence and the area and the signal loss of the chip can be reduced. Furthermore, the impedance of the receiving path (PATH r) and the impedance of the transmitting path (PATH t) shall be designed to be similar, such that they can share the same external impedance matching circuit.

Referring to the front-end circuit 300 shown on FIG. 5, the first switch 333 of the transmitting block 330 is connected to the transmitter 35 directly, thereby, the transmitter 35 is connected to the antenna unit 31 and the receiver 37 through the first switch 333. Referring to the front-end circuit 400 shown on FIG. 6, the first switch 333 of the receiving block 430 is connected to the receiver 47 directly, thereby, the receiver 47 is connected to the antenna unit 31 and the transmitter 45 through the first switch 333.

Figure 7:
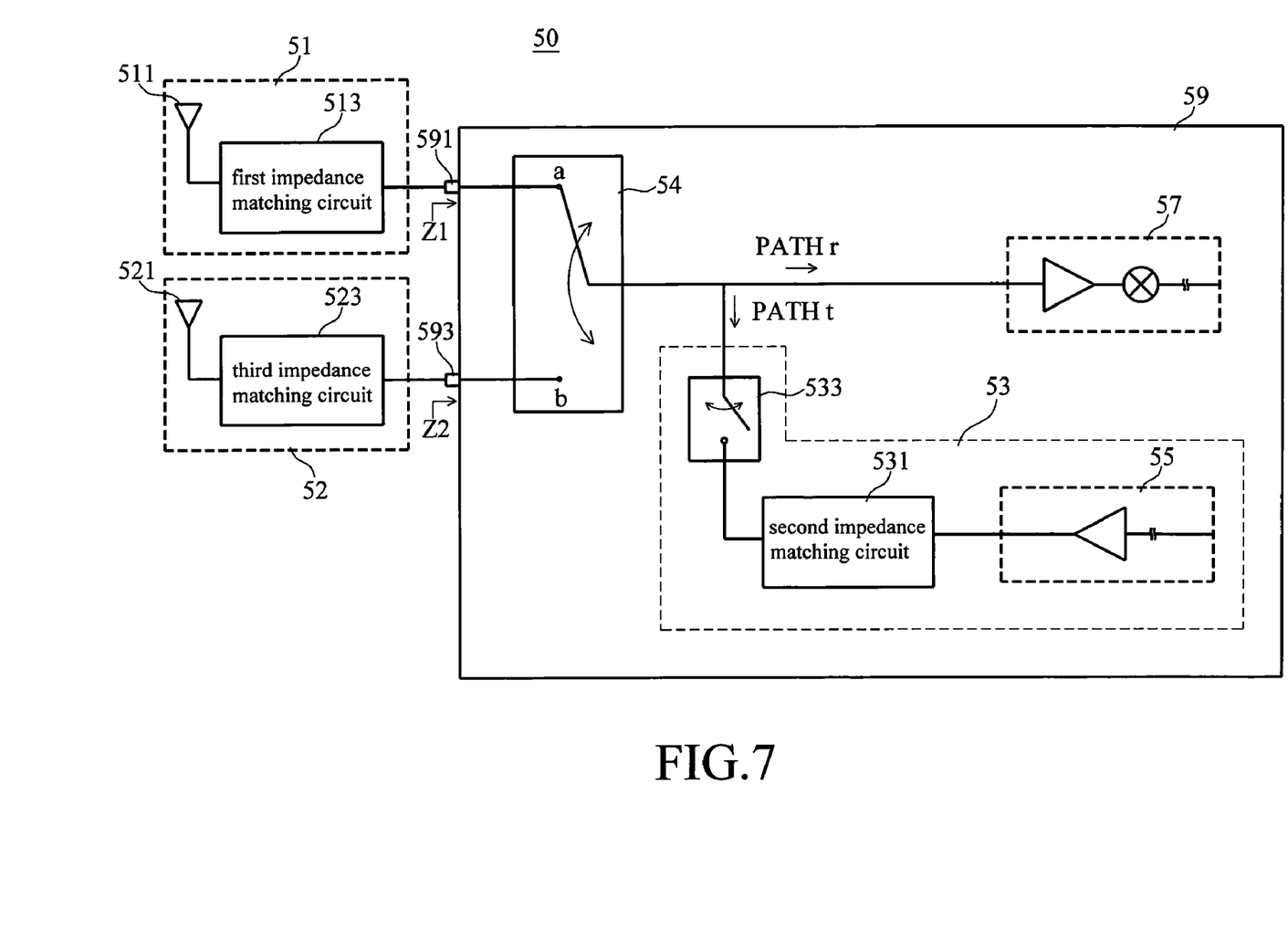
FIG. 7 is a block diagram showing a front-end circuit of the wireless transceiver in accordance with another embodiment of the present invention.

Referring to FIG. 7, a block diagram showing a front-end circuit of the wireless transceiver in accordance with another embodiment of the present invention is disclosed. The front-end circuit 50 comprises two antenna units, a second switch 54, a transmitting block 53, and a receiver 57, wherein the two antenna units include a first antenna unit 51 and a second antenna unit 52. The transmitting block 53 and the receiver 57 are connected to the first antenna unit 51 and the second antenna unit 52 through the second switch 54. Besides, the transmitting block 53, the receiver 57, and the second switch 54 are integrated within a single chip 59.

With respect to the embodiment of the present invention, the number of the antenna unit is two, which are the first antenna unit 51 and the second antenna unit 52 respectively, as well as, they are connected to the transmitting block 53 and the receiver 57 through the second switch 54 for reducing the dead angle occurred during the signal transmitting or receiving process. According to the operation of the second switch 54, the first antenna unit 51 or the second antenna unit 52 can be selected to receive or transmit signal, for example, while the second switch 54 has switched to the "a" terminal, the front-end circuit 50 will transmit or receive signal through the first antenna unit 51, otherwise, while the second switch 54 has been switched to the "b" terminal, the front-end circuit 50 will transmit or receive signal through the second antenna unit 52.

The second switch 54 is used for selecting the first antenna unit 51 and the second antenna unit 52 for transmitting or receiving signal. The transmitting block 53 comprises a first switch 533, a second impedance matching circuit 531, and a transmitter 55, wherein the first switch 533 is used for controlling the operation mode of the front end circuit 50, such as transmitting or receiving signal.

The first antenna unit 51 comprises an antenna 511 and a first impedance matching circuit 513, the second antenna unit 52 comprises an antenna 521 and a third impedance matching circuit 523, as well as, the transmitting block 53 comprises a second impedance matching circuit 531, thereby, the impedance matching between the first antenna unit 51 and the transmitting block 53 or between the first antenna unit 51 and the receiver 57 can be achieved according to the proper selection from the first impedance matching circuit 513, the second impedance matching circuit 531, and the third impedance matching circuit 523 while the first antenna unit 51 is used for transmitting or receiving signal, as well as, the impedance matching between the second antenna unit 52 and the transmitting block 53 or between the second antenna unit 52 and the receiver 57 can be achieved while the second antenna unit 52 is used for transmitting or receiving signal.

Since the front-end circuit 50 further comprises a second switch 54, the impedance of the second switch 54 has to be considered while the impedance matching operation is processing, for example, the second switch 54 can be selected to be a symmetrical switch, therefore, while the impedance of the receiving path (PATH r) and the impedance of the transmitting path (PATH t) are similar, the impedance Z1 of the first pin 591 will be similar to the impedance Z2 of the second pin 593 of the chip 59.

Moreover, there is only the second switch 54 provided between the receiver 57 and the first antenna unit 51, or between the receiver 57 and the second antenna unit 52, as well as, there is no other switches or other impedance matching circuits on the receiving path, thereby, the receiver 57 can be with smaller noise figure accordingly, such that the front-end circuit 50 can be applied for the wireless transceiver that requires better receiving sensitivity.

Figure 8:
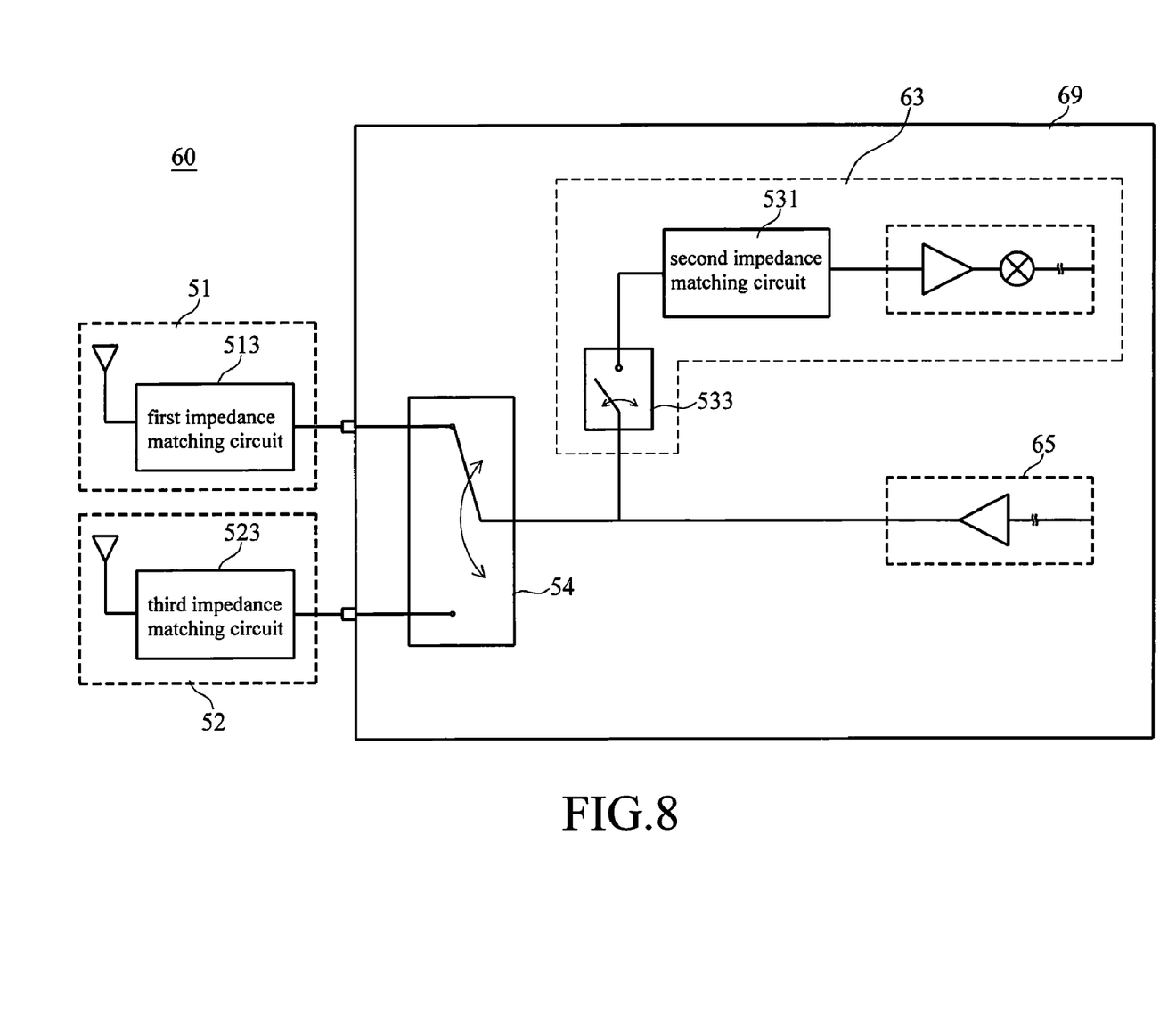
FIG. 8 is a block diagram showing a front-end circuit of the wireless transceiver in accordance with another embodiment of the present invention.

Referring to FIG. 8, a block diagram showing a front-end circuit of the wireless transceiver in accordance with another embodiment of the present invention is disclosed. The front-end circuit 60 comprises an antenna unit 51, a second antenna unit 52, a second switch 54, a receiving block 63, and a transmitter 65, wherein the receiving block 63 and the transmitter 65 are connected to the first antenna unit 51 and the second antenna unit 52 through the second switch 54, wherein the second switch 54 is used for selecting the first antenna unit 51 or the second antenna unit 52 to transmit or receive signal. The receiving block 63, the transmitter 65, and the second switch 54 are integrated within a single chip 69.

The first switch 533 is used for controlling the front-end circuit 60 to transmit or receive signal, furthermore, the impedance matching between the first antenna unit 51 and the receiving block 63 or between the first antenna unit 51 and the transmitter 65 can be achieved according to the proper selection from the first impedance matching circuit 513, the second impedance matching circuit 531, and the third impedance matching circuit 523 on the process of transmitting or receiving signal via the first antenna unit 51, as well as, the impedance matching between the second antenna unit 52 and the receiving block 63 or between the second antenna unit 52 and the transmitter 65 can be achieved on the process of transmitting or receiving signal via the second antenna unit 52.

There is only the second switch 54 provided between the transmitter 65 and the first antenna unit 51, or between the transmitter 65 and second antenna unit 52, as well as, there is no other switches or impedance matching circuits on the transmitting path, thereby, there will be no additional loss on the transmitting path and can be applied to the transceiver which requires higher output power.

Figure 9:
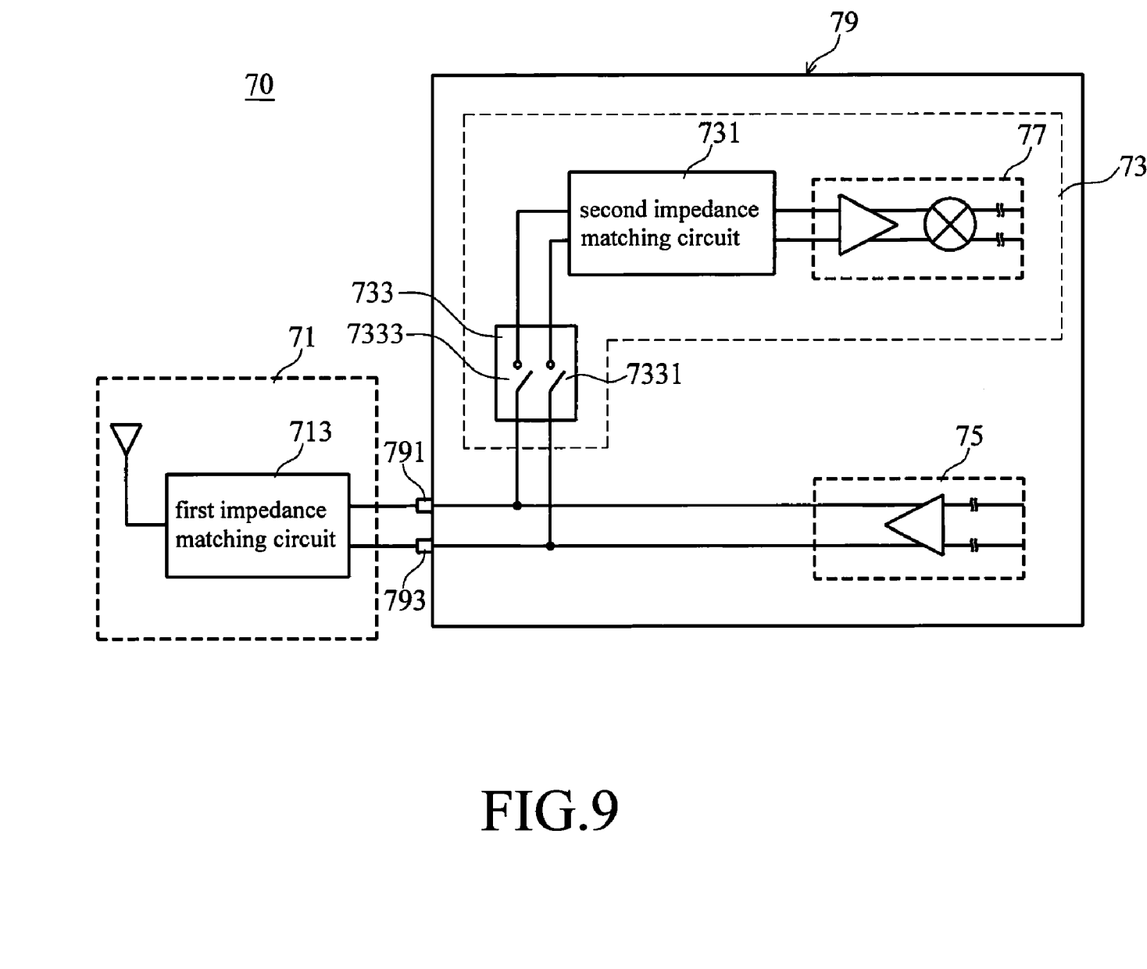
FIG. 9 is a block diagram showing a front-end circuit of the wireless transceiver in accordance with another embodiment of the present invention.

Referring to FIG. 9, a block diagram showing a front-end circuit of the wireless transceiver in accordance with another embodiment of the present invention is disclosed. Compared to the foregoing mentioned embodiments that are single-end RF front-end circuits, the embodiment shown on FIG. 9 illustrates a differential RF front-end circuit.

According to the front-end circuit 70, the antenna unit 71 and the pins 791 and 793 of the chip 79 are connected, and further, the antenna unit 71 is connected to the receiving block 73 and the transmitter 75 through the pins 791 and 793, wherein the receiving block 73 comprises a receiver 77, a second impedance matching circuit 731 and a first switch 733, wherein the first switch 733 is a differential switch and comprises a first sub-switch 7331 and a second sub-switch 7333, thereby, the first switch 733 can be used for switching the operation mode of the front-end circuit 70, such as transmitting or receiving signal. The positions of the first switch 733 and the second impedance matching circuit 731 can be exchanged, and furthermore the second impedance matching circuit 731 can be provided or omitted according to the impedance matching.

Certainly, the single-end RF front-end circuit or the differential RF front-end circuit can be selected according to the requirement of signal transmission with respect to all foregoing mentioned embodiments; in other words, the structure shown on FIG. 9 can be applied on the structures shown on FIG. 3 to FIG. 8.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A front-end circuit of the wireless transceiver, comprising:
   an antenna unit, comprising an antenna and a first impedance matching circuit;
   a receiver, connected to said antenna unit; and
   a transmitting block, connected to said antenna unit and said receiver, comprising a transmitter and a first switch, wherein said receiver and said transmitting block are integrated within a single chip;
   wherein, when said front-end circuit is receiving a signal, said first switch is turned off and when said front-end circuit is transmitting a signal, said first switch is turned on, so as to connect said transmitting block with said antenna,
   wherein said transmitting block further comprises a second impedance matching circuit, thereby, the impedance matching between said antenna unit and said transmitting block or between said antenna unit and said receiver can be achieved, and
   wherein the number of said antenna unit is two, wherein said antenna units are connected to said transmitting block and said receiver through a second switch respectively.

2. The front-end circuit of claim 1, wherein said transmitter is connected to said antenna unit through said first switch and said second impedance matching circuit.

3. The front-end circuit of claim 1, wherein said transmitter is connected to said antenna unit through said second impedance matching circuit and said first switch.

4. The front-end circuit of claim 1, wherein said antenna unit comprises a first antenna unit and a second antenna unit.

5. The front-end circuit of claim 4, wherein said first antenna unit and said second antenna unit are connected to said transmitting block and said receiver through said second switch.

6. The front-end circuit of claim 1, wherein said first switch is a differential switch and comprises a first sub-switch and a second sub-switch.

7. A front-end circuit of the wireless transceiver, comprising:
   an antenna unit, comprising an antenna and a first impedance matching circuit;
   a transmitter, connected to said antenna unit; and
   a receiving block, connected to said antenna unit and said transmitter, comprising a receiver and a first switch, wherein said receiving block and said transmitter are integrated within a single chip;
   wherein, when said front-end circuit is transmitting a signal, said first switch is turned off and when said front-end circuit is receiving a signal, said first switch is turned on, so as to connect said receiving block with said antenna;
   wherein said receiving block further comprises a second impedance circuit, thereby, the impedance matching between said antenna unit and said transmitter or between said antenna unit and said receiving block can be achieved; and wherein the number of said antenna unit is two, wherein said antenna units are connected to said transmitter and said receiving block through a second switch respectively.

8. The front-end circuit of claim 7, wherein said receiver is connected to said antenna unit through said first switch and said second impedance matching circuit.

9. The front-end circuit of claim 7, wherein said receiver is connected to said antenna unit through said second impedance matching circuit and said first switch.

10. The front-end circuit of claim 7, wherein said antenna unit comprises a first antenna unit and a second antenna unit.

11. The front-end circuit of claim 10, wherein said first antenna unit and said second antenna unit are connected to said transmitter and said receiving block through said second switch.

12. The front-end circuit of claim 7, wherein said first switch is a differential switch and comprises a first sub-switch and a second sub-switch.

* * * * *